US009104976B2

(12) United States Patent
Bonastre et al.

(10) Patent No.: US 9,104,976 B2
(45) Date of Patent: Aug. 11, 2015

(54) METHOD FOR CLASSIFYING BIOMETRIC DATA (75) Inventors: Jean-François Bonastre, Velleron (FR); Xavier Anguera Miro, Barcelona (ES)

(73) Assignee: UNIVERSITE D'AVIGNON ET DES PAYS DE VAUCLUSE, Avignon (FR)

( * ) Notice: Subject to any disclaimer, the term of this patent is extended or adjusted under 35 U.S.C. 154(b) by 299 days.

(21) Appl. No.: 13/825,711

(22) PCT Filed: Sep. 19, 2011

(86) PCT No.: PCT/FR2011/052151
§ 371 (c)(1),
(2), (4) Date: Jun. 5, 2013

(87) PCT Pub. No.: WO2012/038654
PCT Pub. Date: Mar. 29, 2012

(65) Prior Publication Data
US 2013/0262356 A1    Oct. 3, 2013

(30) Foreign Application Priority Data

Sep. 24, 2010   (FR) ...................................... 10 57732

(51) Int. Cl.
G06F 15/18        (2006.01)
G06E 1/00         (2006.01)
G06E 3/00         (2006.01)
G06G 7/00         (2006.01)
G06N 3/08         (2006.01)
G06K 9/62         (2006.01)
G10L 17/00        (2013.01)

(52) U.S. Cl.
CPC ................ *G06N 3/08* (2013.01); *G06K 9/6215* (2013.01); *G10L 17/00* (2013.01)

(58) Field of Classification Search
USPC .......................................................... 706/20
See application file for complete search history.

(56) References Cited

U.S. PATENT DOCUMENTS 5,844,287 A       12/1998  Hassan et al.
7,349,758 B2 *    3/2008   Miro et al. .................... 700/245
8,639,506 B2 *    1/2014   Miro et al. .................... 704/241

FOREIGN PATENT DOCUMENTS

WO    WO 2007/131530 A1    11/2007
WO    WO 2010/049695 A1    5/2010

OTHER PUBLICATIONS

An approach for multimodal biometric fusion under the missing data scenario Quang Duc Tran ; Liatsis, P. ; Bing Zhu ; Changzheng He Uncertainty Reasoning and Knowledge Engineering (URKE), 2011 International Conference on vol. 1 DOI: 10.1109/URKE.2011.6007853 Publication Year: 2011 , pp. 185-188.*

(Continued)

*Primary Examiner* — Michael B Holmes
(74) *Attorney, Agent, or Firm* — Patterson Thuente Pedersen, P.A.

(57) ABSTRACT

Methods, systems, and computer program products for biometric authentication and more particularly to a method for classifying biometric data consisting in constructing, on the basis of a first universal statistical model and based on a set of first individual collections of biometric data, a second statistical model comprising a plurality of statistical sub-models and taking into consideration the biometric specificities of an individual or class of individuals, such that the first and second statistical models jointly define a highly discriminatory universal statistical model.

18 Claims, 6 Drawing Sheets

(56) References Cited

OTHER PUBLICATIONS

Influence of different walking speeds and surfaces on accelerometer-based biometric gait recognition Muaaz, M. ; Nickel, C. Telecommunications and Signal Processing (TSP), 2012 35th International Conference on DOI: 10.1109/TSP.2012.6256346 Publication Year: 2012 , pp. 508-512.*

Globally Linear Embedding of Biometric Scores: An Empirical Study Sarkar, S. ; Mohanty, P. Biometrics: Theory, Applications and Systems, 2008. BTAS 2008. 2nd IEEE International Conference on DOI: 10.1109/BTAS.2008.4699365 Publication Year: 2008 ,pp. 1-6.*

Intelligent Shoes for Human Identification Bufu Huang ; Meng Chen ; Weizhong Ye ; Yangsheng Xu Robotics and Biomimetics, 2006. ROBIO '06. IEEE International Conference on DOI: 10.1109/ROBIO.2006.340268 Publication Year: 2006 , pp. 601-606.*

Anguera: "A Novel Speaker Binary Key Derived from Anchor Models", Interspeech 2010, Sep. 26, 2010, pp. 2118-2121, XP055000398, Retrieved from the Internet: URL:http://lia.univ-avignon.fr/fileadmin/documents/Users/Intranet/fich__art/i10__2118.pdf [retrieved on Jun. 9, 2011] Section 2, 2.1 2.2.

Daniel Povey et al: "Universal background model based speech recognition", Acoustics, Speech and Signal Processing, 2008. ICASSP 2008. IEEE International Conference on, IEEE, Piscataway, NJ, USA, Mar. 31, 2008, pp. 4561-4564, XP031251613, ISBN: 978-1-4244-1483-3.

Reynolds D A et al: "Speaker Verification Using Adapted Gaussian Mixture Models", Digital Signal Processing, vol. 10, No. 1-03, Jun. 3, 1999, pp. 19-41, XP001076861, Academic Press, Orlando,FL, US ISSN: 1051-2004, DOI: 10.1006/DSPR.1999.0361.

Zhenchun Lei et al: "An UBM-Based Reference Space for Speaker Recognition", 18th International Conference on Pattern Recognition (ICPR'06), vol. 4, Aug. 20, 2006-Aug. 24, 2006, pp. 318-321, XP055000400, DOI: 10. 1109/ICPR.2006.265 ISBN: 978-0-76-952521-1.

Mami et al: "Speaker recognition by location in the space of reference speakers", Speech Communication, vol. 48, No. 2, Feb. 1, 2006, pp. 127-141, XP005231086, Elsevier Science Publishers, Amsterdam, NL ISSN: 0167-6393, DOI: 10.1016/J.SPECOM.2005.06.014.

* cited by examiner

METHOD FOR CLASSIFYING BIOMETRIC DATA

PRIORITY CLAIM

The present application is a National Phase entry of PCT Application No. PCT/FR2011/052151, filed Sep. 19, 2011, which claims priority from FR Application No. 1057732, filed Sep. 24, 2010, said applications being hereby incorporated by reference herein in their entirety.

FIELD OF THE INVENTION

The invention relates to the field of methods, systems, and computer program products for biometric authentication. The invention more particularly relates to a method for classifying biometric data belonging to a continuous and limited observation range corresponding to at least one biometric sensor of determined type.

BACKGROUND OF THE INVENTION

In the field of biometric authentication, biometrics which allow for the authentication of an individual comprise: for example his/her voice, body movements, fingerprints or palm prints, iris structure, venous networks of his/her retina or palm of his/her hand, morphology of his/her hand as well as his/her facial features.

Each biometry is collected by at least one biometric sensor of a determined type, for example a microphone for detecting the voice of an individual. The sensor transforms the biometry that it detects into an analog signal. Owing to the technical features of the sensor (physical value detected, precision), the analog signal is defined in a continuous and limited observation range. In a known manner, during a step of sampling, for example over time, this signal is sampled then during a step of parameterization, a contiguous set of samples is transformed, for example by implementing Fourier transform, in order to obtain at least a multidimensional vector of determined parameters defined in a first area of representation. An analog signal is thus represented in the first area of representation by a sequence of multidimensional parameter vectors. In the rest of the text, each occurrence of the terms "biometric data" refers to a multidimensional parameter vector and each occurrence of the terms "set or collection of biometric data" refers to one or several sequences of multidimensional parameter vectors.

The main methods of biometric authentication are based on the statistic modeling of the first area of representation in a second area of representation. This statistical modeling particularly rests on the hypothesis that a set of biometric data may be represented and classified in the second area of representation in the form of a probability distribution. This hypothesis is reasonable within certain limits that are not mentioned here and has the advantage of defining each set of biometric data in a form that is easily manipulated mathematically. It is possible to define the distribution of biometric data in the second area of representation by a set of simple statistical distributions, each characterized by a limited set of parameters. In the case of a universal collection of biometric data, the set of distributions representing said universal collection constitutes a mean statistical model, called universal statistical model. For example, in the field of vocal recognition, the classification methods are based on the statistical modeling of the acoustic space in an area of representation defined by a mixture of Gaussian distributions or GMM (Gaussian Mixture Model) wherein is classified a universal collection of voice signatures from a large number of speakers. The universal statistical modeling thus constructed is well known by initials UBM (Universal Background Model). The universal statistical modeling from this statistical modeling constitutes a mean reference with respect to which individual models may be derived thanks to an adaptor or a so-called Maximum A Posteriori (MAP) estimator, adapting or estimating all or part of the parameters describing the universal model. In general, only the parameters corresponding to the means of Gaussian distributions are adapted. The, thus model adapted to an individual or a class of individuals represents the specificities of said individual or class of individuals. As the universal model must comprise a large number of statistical distributions in order to be generic and that an individual or class of individuals is specified by means of a limited collection of biometric data, only a small part of statistical distributions, that is to say, parameters describing these distributions, is adapted to a speaker or a given class. The statistical distributions composing the universal model are called "components" of said model. When a collection of biometric data must be compared with a given individual model, a likelihood score is obtained by comparing the likelihood of these data with the individual model with respect to the likelihood of the same data with the universal model. The function corresponding to these Likelihood scores is called "likelihood ratio" and is generally projected in the logarithmic space in order to define the function called "Log-likelihood ratio" or LLR.

Figure 1:
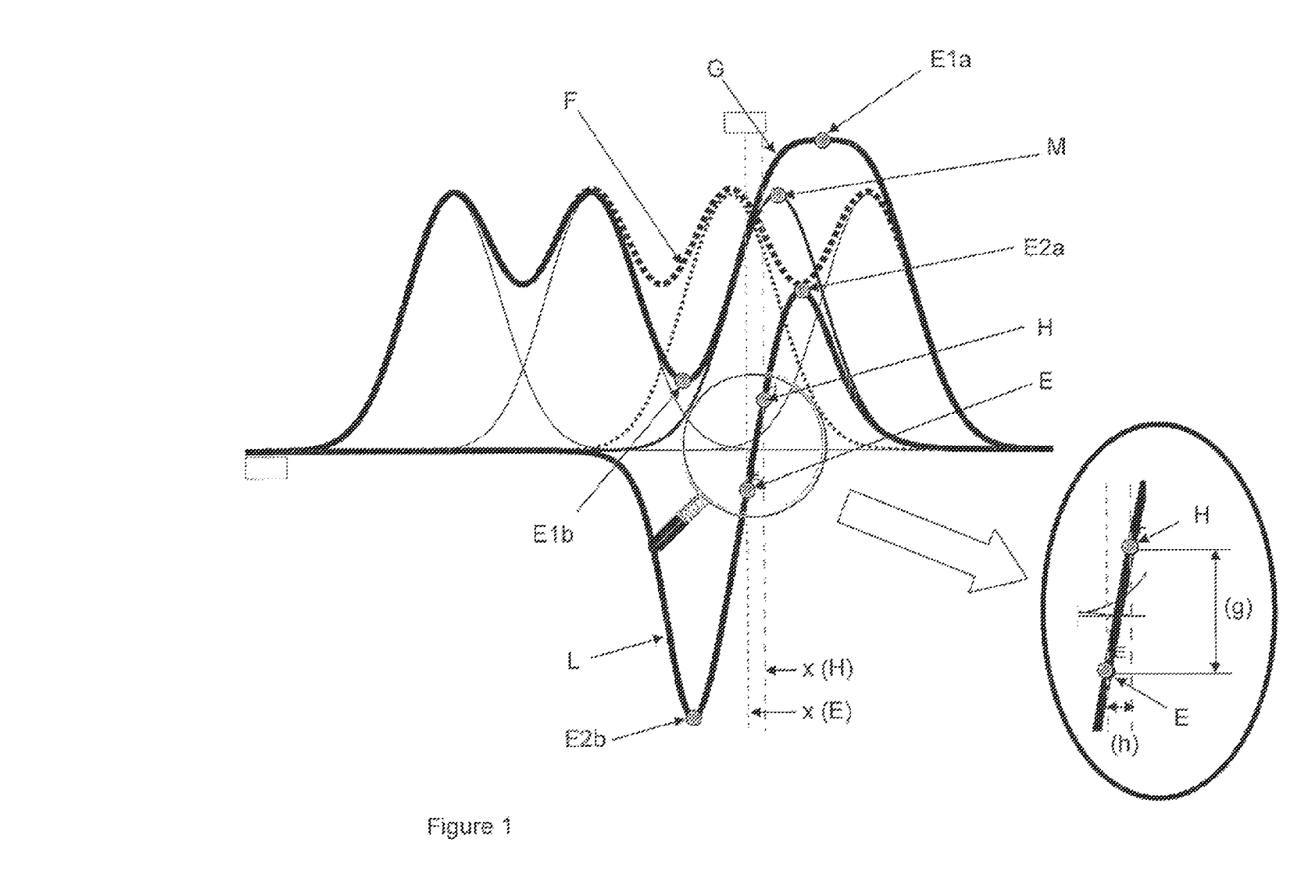
FIG. 1 represents a graphic illustrating the limitations of the statistical modeling approach according to the prior art.

However, if this approach based on statistical modeling is powerful and widely used, it is important to note that it has its limitations. FIG. 1 illustrates at the same time the general principle of statistical modeling and its main limitations. FIG. 1 more particularly illustrates the probability distribution function F of a universal statistical model such as UBM (composed of four components only in a one-dimensional area of representation) and the probability distribution function G of an individual model derivative of this statistical model by MAP adaptation (of a single component of the universal model only adapting the mean parameters from amongst the parameters describing this component). FIG. 1 also illustrates the LLR function, referenced L, pertaining to the considered individual model and the universal model. The below comments made with reference to FIG. 1 facilitate the comprehension of the limitations of the approach by statistical modeling.

The M point on FIG. 1 represents the average of the component adapted to the individual model. This average represents an information specific to the individual from individual learning biometric data. The point E1$a$ represents the local maximum of the probability distribution function G of the individual model nearest to point M and point E1$b$ representing the minimum local of the probability distribution function G of the individual model nearest to the point M. It is observed that points E1$a$ and E1$b$ do not have the same abscissa, nor are they symmetrically distributed around point M. This is not only due to the adaptation by MAP, but also to the limitation of the number of components of the universal statistical model. The latter is directly linked to the need of having reliable statistical estimations making it possible to obtain an individual model whereof a significant part of the components show parameters that vary significantly with respect to those of the universal model of which it is from.

Always with reference to FIG. 1, the log-likelihood ratio shows a maximum E2$a$ and a minimum E2$b$ that are distant from the point M. Two points H and E of the log-likelihood ratio respectively of slightly different abscissa x(H) and x(E) such that the distance x(H)-x(E) is of the order of magnitude of the distance x(E2a)-x(M), respectively give a positive and negative score. Thus, a small variation or error on the x-axis may result in different decisions as to knowing if the probability distribution function G of the individual model is likely or not. Thus, it appears that the decision is not directly linked to the information specific to the individual.

These observations make it possible to illustrate that the method by the standard statistical modeling lacks robustness with respect to a shifting of a small variation or error on the biometric data, as the effect of this shifting on the decision may be critical. It is to be noted that a shifting may simply be due to one of the sources of variability (or noise), for example the use of different microphones to collect voice signatures or the detection of voice signatures in different acoustic environments (enclosed or outside). These sources of variability are well known in the biometric authentication field and many documents of the prior art, for example referenced international application WO 2010/049695 or the referenced international application WO 2007/131530, put forward solutions intended to make it possible to increase the robustness of the standard statistical modeling approach with respect to the sources of variability without however questioning this approach.

Figure 2:
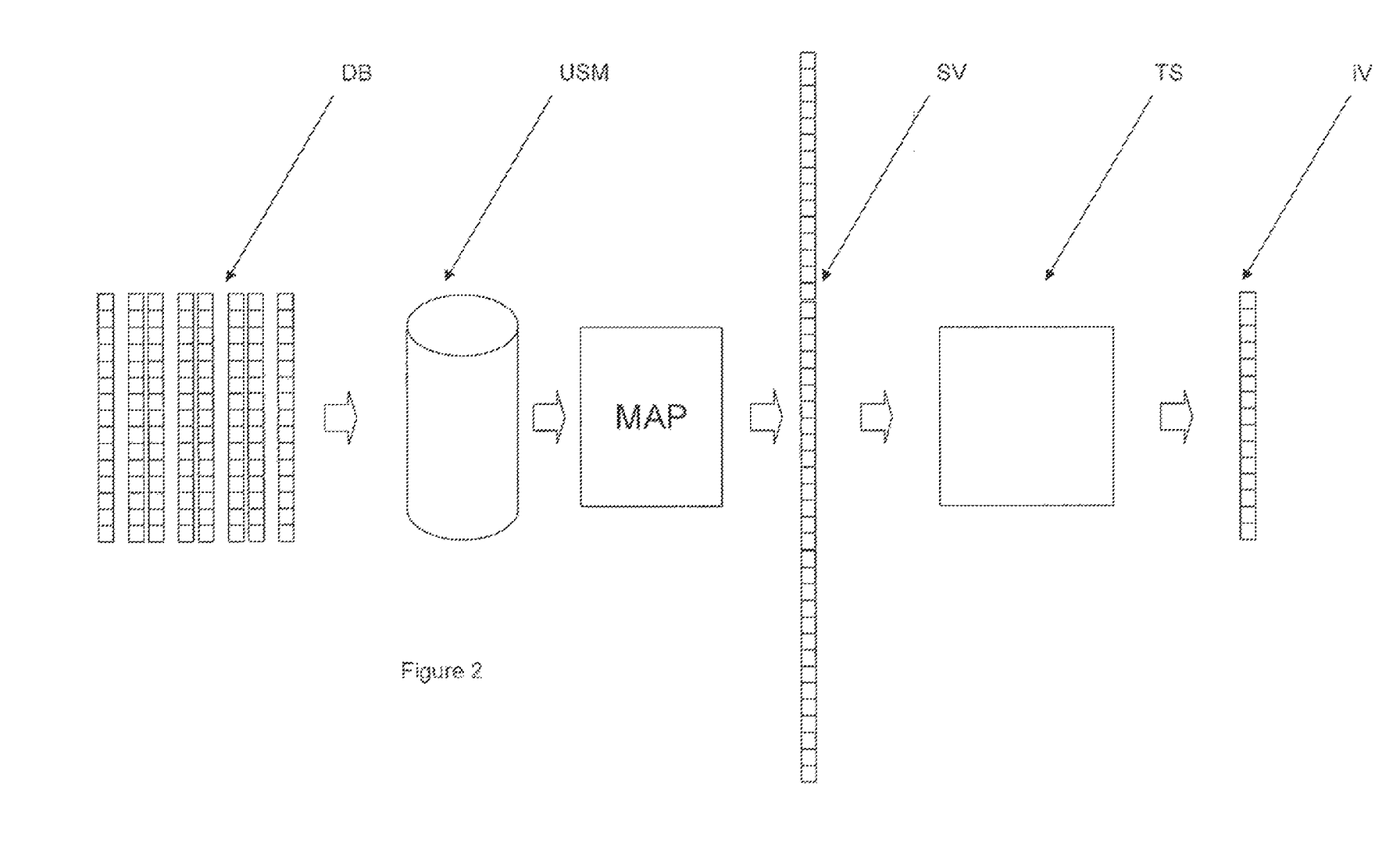
FIG. 2 schematically represents different developments of the statistical modeling approach according to the prior art, such as illustrated by FIG. 1.

It is also known of the prior art different developments of the approach by statistical modeling presented below. These developments are briefly described below, particularly with reference to FIG. 2.

A first development of the approach by standard statistical modeling consists in considering the universal statistical model (USM) as a definition of an area of representation of new data defined by the concatenation of mean parameters of each of the components constituting said model, these new data being known by the name of super vectors (SV). This area called super vector space, makes it possible to use support vector machines (SVM) which are a set of supervised learning techniques intended to resolve discrimination and regression issues.

A second development of the approach by standard statistical modeling consists in a direct modeling of the variability of sessions in the super vector space by using a joint Factor analysis known by initials JFA.

More recently, the concept of total variability space (TS) has been introduced, consisting in modeling the total variability in the super vector space such as to construct a smaller space that concentrates the information and wherein it is easier to jointly model the variability of sessions and speakers. More particularly, each vector of the super vector space corresponds to a vector called iVector (iV), in the total variability space.

Several comments can be made regarding the latter approaches. First of all, the super vector space counts a very large number of dimensions (currently hundred thousands of dimensions), thus rendering its joint factor analysis difficult. Secondly, the extraction of the iVector corresponds precisely to a reduction of the dimensionality to a few thousand dimensions only, thus mainly making it possible to apply simpler approaches in order to differentiate the variability of sessions and variability of speakers: the extraction techniques of the iVector are similar to the joint factor analysis techniques because these two types of techniques work in a same type of space, the super vector space. Thirdly, the super vector space in the approach by statistical modeling of a universal collection of biometric data with a Gaussian mixture model and the reduced dimensionality space linked with the extraction of the iVector are constructed according to the same schema: a step of re-parameterization taking into consideration in input a set of biometric data (BD) and with in output one single vector representing the input set. The FIG. 2 simplifies these two steps of re-parameterization and illustrates the reduction in the size of the associated data.

The approach by statistical modeling through the use of super vectors and/or the total variability thus has advantages, but also has at least two limitations discussed hereinafter.

First, as a set of biometric data is represented by a unique point in the area of representation, it is difficult in this approach to exploit information temporally or sequentially, for example within a setting of unsupervised learning as well as applying this approach in order to fulfill other tasks, such as indexing or segmenting the analog signal provided by the biometric sensor.

Second, the super vector space and the total variability space are both based on the concept of global and general information: information is important because it appears frequently. Thereby, these spaces do not intrinsically take into account the discriminatory specificities of an individual or a class of individuals, yet the purpose of any biometric classification is precisely to take into consideration these discriminatory specificities. In this regard, these spaces have the drawbacks stated in the comments made with reference to FIG. 1.

SUMMARY OF THE INVENTION

A method for classifying biometric data, according to an embodiment of the present invention, belongs to a first continuous and limited area of representation corresponding to at least one determined type biometric sensor, such as it comprises:

a step of defining a second area of representation wherein each biometric data is represented by a first distribution such that the biometric data are represented thereto by a first set of first distributions, the first distributions responding to a same probability distribution function of at least one first parameter, such that the first set of first distributions is defined by a first set of first parameters determined based on biometric data, a first step of constructing a first statistical model in automatic classification of a universal collection of biometric data in the second area of representation, the first statistical model being defined by at least a second finite set of second distributions, the second distributions responding to a same probability distribution function of at least a second parameter and being distributed in the second area of representation according to at least a second set of second parameters, such that each second distribution defines a sub-space of representation comprising a plurality of first distributions representative of a part of said universal collection of biometric data, the second set of second parameters being optimized by a first implementation of a likelihood maximization algorithm, such that the second finite set of second distributions represents with the maximum likelihood the first set of first distributions corresponding to said universal collection of biometric data, the first statistical model thus being at least able to match any biometric data with a determined sub-space, each sub-space being associated with a plurality of biometric data, and a second step of constructing a second statistical model comprising a plurality of statistical sub-models in automatic classification of a set of first individual collections of biometric data, each sub-model being defined in a corresponding sub-space of the second area of representation, the second step of constructing comprising, for each distribution representative of each biometric data of each individual collection, the determination of the sub-space corresponding thereto according to the first statistical model, and, in this sub-space, its classification in the corresponding sub-model, such that each sub-model is defined by a third set of first distributions, the second step of constructing further comprising, for each sub-space, a step of selecting first distributions amongst said third set of first distributions by implementing a coverage maximization and redundancy minimization iterative algorithm, for determining a fourth minimum set of first distributions maximizing the coverage of the sub-space, such that each sub-model is defined by the fourth minimum set of first distributions corresponding to it, such that the plurality of statistical sub-models of the second statistical model is defined by a plurality of fourth minimum sets of first distributions, the second statistical model being thus at least able to make it possible for any biometric data of a determined sub-space according to the first statistical model, to determine at least the first distribution with which its likelihood is maximum amongst the first distributions of the fourth minimum set of first corresponding distributions.

The classification method thus makes it possible to construct, on the basis of a first universal statistical model, a second statistical model taking into account the biometric specificities of an individual or a class of individuals. These two statistical models jointly define a highly discriminatory universal statistical model.

According to an embodiment, the method further comprises a first step of generating a set of likelihood vectors based on a second individual collection of biometric data, the generation step comprising, for each first distribution representative of each biometric data of the second individual collection:
- the determination of the corresponding sub-space according to the first statistical model,
- in this sub-space, the computation of a likelihood value between the first distribution representative of the considered biometric data and each of the first distributions of the fourth minimum set corresponding to the sub-space, and
- the selection of at least one likelihood amongst the highest ones, such as to generate, based on each data of said second individual collection of biometric data and for each statistical sub-model of the second statistical model a likelihood vector composed of selected likelihood values.

Thus, the joint usage of the first and second statistical models makes it possible to generate highly discriminatory information representing the identity of an individual according to his/her biometric data, whether the latter make up or not the part of said universal collection of biometric data or said set of first individual collections.

According to another embodiment, the method further comprises a step of generating a set of first binary vectors based on the second individual collection of biometric data, this step consisting for each likelihood vector in achieving a statistical sampling determined amongst those which consist in:
- replacing the likelihood values higher than a first threshold value determined by a bit equal to 1 and replacing the others by a bit equal to 0, or
- replacing a number N of the highest likelihood values with a bit equal to 1 and replacing the others by a bit equal to 0, the number N being predetermined or the number N being estimated based on the considered biometric data, such that each biometric data corresponds to a first binary vector.

The classification method thus makes it possible to represent the highly discriminatory information representing the identity of an individual in binary form whereof the storage, the electronic handling and the transfer are easy and to make available the methods and systems for authenticating the wide application field defined in the binary space.

According to another embodiment, the method further comprises a step of generating at least a second binary vector based on the set of first binary vectors or sub-sets of the first binary sectors, this step consisting in achieving, between the first binary vectors of the set or each sub-set, a logic operation amongst those which consist in:
- implementing a majority voting algorithm in order to determine, by bit-to-bit sequential comparisons between the first considered binary vectors, said at least a second binary value by a distributed set of bits equal to 1, each corresponding to a mean occurrence of bits equal to 1 higher than a second determined threshold value, or
- implementing a logic sequential bit-to-bit comparison algorithm of "AND" or "exclusive-OR" type between the first considered binary vectors in order to determine said at least second binary vector by a distributed set of bits equal to 1, each corresponding to a total occurrence of bits equal to 1 or to a unique occurrence of a bit equal to 1 amongst the first considered binary vectors, respectively, or
- implementing a vector to vector movement synchrony determining algorithm amongst the first considered binary vectors, to determine said at least second binary vector by a set of bits equal to 1 distributed according to a sequence of bits equal to 1 of the first binary vectors observed with a mean occurrence higher than a third determined threshold value.
- said at least second binary vector comprising the same number of bits as each of said first binary vectors and the choice of the logic operation being dictated by the number of bits equal to 1 of said at least second binary vector obtained.

The method thus makes it possible to easily monitor the identity of an individual by the simple comparison of two second independently determined binary vectors, a second binary vector said of reference and a second binary vector said of authentication.

According to another particularity, each first or second binary vector comprises a number of bits equal to 1 determined among others according to one of the first, second and third threshold values, this number being less by at least an order of magnitude than the number of bits equal to 0.

By defining "hollow" binary vectors, in other words comprising more bits equal to 0 than bits equal to 1, the method makes it possible to ensure a level of finely monitored discrimination and define and easily adjust a tolerance threshold for the authentication decision from the comparison between a second reference binary vector and a second binary authentication vector, the tolerance threshold being for example defined by a number of differences in terms of bits or bit sequences over a total number of bits of each said second binary vectors or over a number of identical bit sequences determined by the comparison between these two binary vectors, respectively.

According to another embodiment, the first statistical model is a hidden Markov model defined by the second finite set of second distributions according to a set of parameters whereof at least a set of state probabilities, each associated with a biometric data, and a set of transition between state probabilities, the first implementation consisting in implementing the so-called Baum-Welch likelihood maximization algorithm.

The method thus makes it possible to construct a first statistical model which takes into account the biometric data processing sequence.

According to another embodiment, the first statistical model is a Gaussian mixture model defined by the second finite set of second distributions according to the set of parameters whereof a set of mean vectors, a set of covariance matrices and a set of prior probabilities, the first implementation consisting in implementing the likelihood maximization algorithm so-called expectation-maximization algorithm based on a criterion of determined maximum likelihood.

The method thus makes it possible to construct a first statistical model independent from the biometric data processing sequence, thus allowing for an unsupervised automatic learning and/or classification.

According to another embodiment, each of said first distributions is a Gaussian distribution, such that each statistical sub-model of the second statistical model is defined by a third set of Gaussian distributions according to sets of parameters whereof a set of mean vectors, a set of covariance matrices and a set of prior probabilities.

The method thus makes it possible to construct a second statistical model, which, once constructed, is easily simplifiable in a very good approximation, if its construction is complex. Particularly, the implementation of the coverage maximization and redundancy minimization iterative algorithm is simplified in the approximation of the mean covariance matrix.

According to another embodiment, the set of first individual collections of biometric data is from a cut-out of the universal collection of biometric data.

The invention also relates to a method for biometric authentication substantially such that it comprises at least:
- a step of detecting a biometry determined by a sensor of determined type and a processing of the biometry detected to transform it into a second individual collection of biometric data representative of an individual,
- a step of the biometric data classification method, such as described above, to determine a second binary vector of reference and a second binary vector of authentication based on said individual collection of biometric data,
- a step of comparing these two second binary vectors, and
- a step of deciding to authenticate or not an individual based on the result of the preceding comparison step.

According to an embodiment, the comparison step consists in implementing a movement synchrony determining algorithm between the second binary vector of reference and the second binary vector of authentication in order to determine the occurrence of sequences of bits equal to 1 identical between these two vectors.

According to an embodiment, the step of deciding to authenticate or not an individual comprises a step of defining and adjusting a tolerance threshold for the authentication decision, the tolerance threshold being defined by a number of differences in terms of bits or sequences of bits over a total number of bits of each said second binary vectors or over a number of sequences of identical bits between these two binary vectors determined during the comparison step, respectively.

The invention also substantially relates to a biometric authentication system such that it comprises:
- a sensor of determined type able to detect a determined biometry and transform it into a second individual collection of biometric data representative of an individual to be authenticated,
- a first memorization medium able to store at least the first and second statistical models and a computer able to make it possible to implement at least a step of the biometric data classification method such as described above, to obtain at least a second binary authentication vector based on the second individual collection of biometric data having been transmitted thereto by the sensor,
- a comparator model for comparing the second binary authentication vector with a second previously generated binary reference vector and stored in a second memorization medium connected to the comparator module, and
- a decision module to decide whether or not to authenticate an individual.

The system is thus able to authenticate an individual whether his/her biometric data are part or not of the collections of biometric data having made it possible to generate the first and second statistical models.

According to a first embodiment, the system is such that the memorization medium, the computer, the comparator module and the decision model are embedded in a same device communicating by wire connection or radiofrequency.

The first embodiment of the system is thus able to control the access to a secure location or the access to a service, for example a bank service, offered via wireless communication networks.

According to a second embodiment, the system is such that:
- the first memorization medium and the computer are embedded in a first device communicating by wire connection or radiofrequency connection and connected to the sensor, and
- the second memorization medium, the comparator module and the decision module are embedded in a second device communicating by wire connection or radiofrequency connection with the first communication device.

The second embodiment of the system thus makes it possible to only process at the second device the steps of the authentication method consisting in the comparison step and the decision step, such that the second device only requires slight storage and processing means.

The invention also relates to a computer program product of biometric authentication comprising portions of program code registered on a computer readable medium, to implement at least one step of the biometric data classification method described above when the program operates on a computer.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The biometric data classification method according to the invention consists in classifying biometric data belonging to a first continuous and limited area of representation corresponding to at least a biometric sensor of determined type. Hence, the method can indifferently be implemented in order to classify biometric data from different biometric data, such as those quoted in the introduction, the only condition being that these biometric data be each able to be represented in the form of biometric data belonging to a first corresponding continuous and limited area of representation.

The method comprises a step of defining a second area of representation. This second area of representation is defined such that each biometric data is represented thereto by a first distribution. The biometric data are thus represented thereto by a first set of first distributions. The first distributions obey a same probability distribution function of at least a first parameter. The first set of first distributions is thus defined by at least a first set of first parameters determined according to biometric data. For example, said probability distribution is the multivariate normal distribution and each first distribution is a Gaussian distribution defined by a vector of means, a covariance matrix and a prior probability.

More particularly, it is about defining a projection function of the biometric data in a space wherein they are in a form that is easily manipulated mathematically. This projection also makes it possible to process in a similar manner a biometric data observed and a set of potential biometric data, not yet observed and localized near the known biometric data. In practice, this projection is virtual and is seen as a step of generalizing the input biometric data.

For example, in the case where Gaussian distributions are used, a biometric data is represented by a Gaussian distribution whereof the average is constituted by the biometric data itself. The variance parameters are thus either ignored, or set at a minimum value.

As mentioned in the introduction, each biometric data consists of a multidimensional vector of parameters defined in the first area of representation. For example, if the multidimensional vector of parameters is of a dimension equal to 50, said area of representation is also of a dimension equal to 50 and each first distribution is defined in this area by at least a first set of 50 first parameters.

The method further comprises a first step of constructing a first statistical model in automatic classification of a universal collection of biometric data in the previously defined second area of representation. This step is described here below with reference to FIG. 3.

Figure 3:
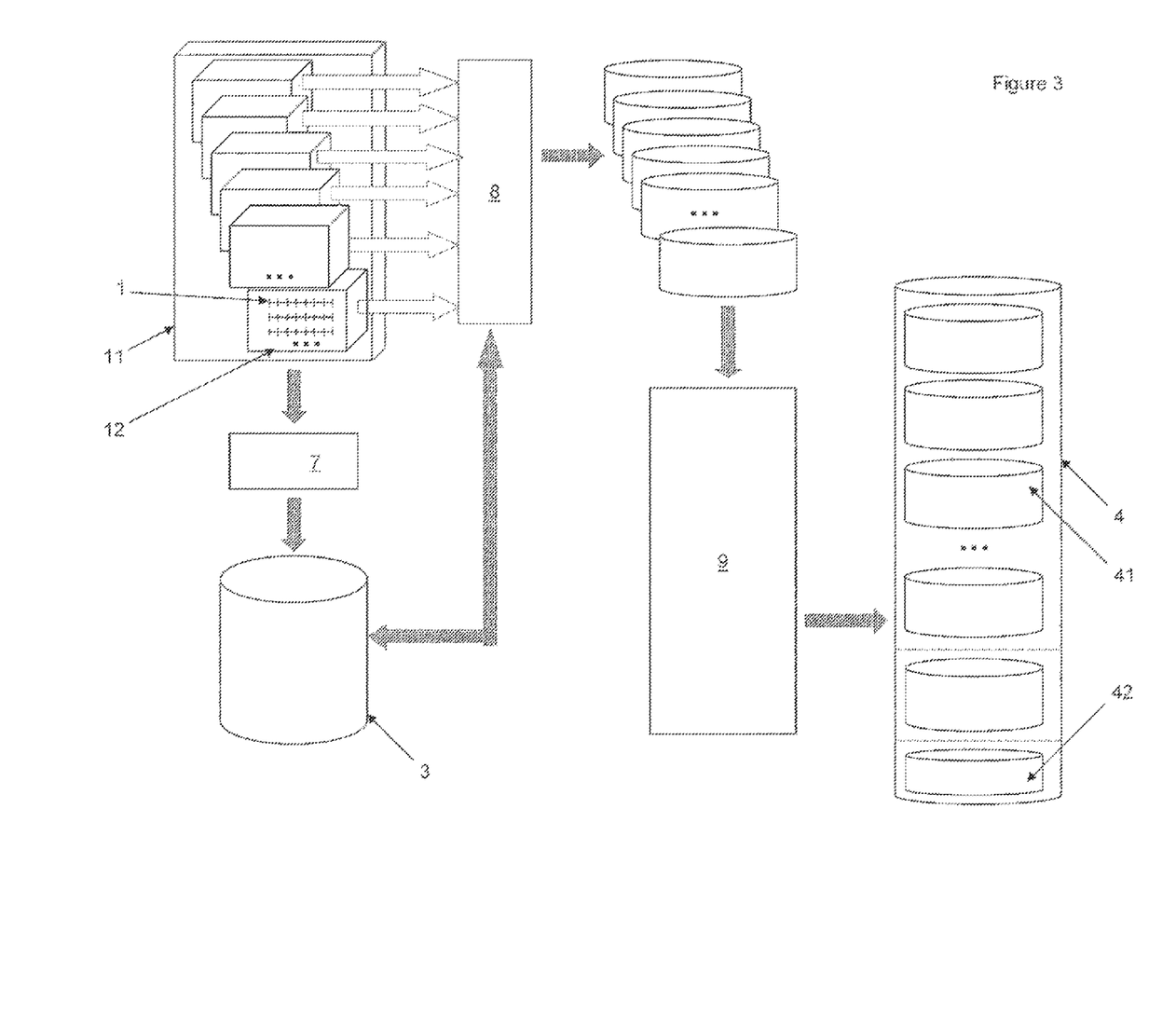
FIG. 3 represents a schema illustrating the steps of the biometric data classification method making possible the construction of a second statistical model according to the invention.

Subject to certain approximations which are not discussed here, it is possible to define said first statistical model 3 such as described hereinafter. The first statistical model is defined by at least a second finite set of second distributions 31. When the second set of second distributions is finite it means that the cardinal of this set is a fixed number, for example equal to 2048. Furthermore, to consider that the second set of second distributions is finite is justified by the fact that the first area of representation is limited. Thus, the first set of first distributions whether it is representative of a collection of biometric data or of another is projected, such as described above, in a limited space of said second area of representation, such that said second finite set of second distributions 31 is at least able to cover said limited space.

The second distributions obey a same probability distribution function of at least a second parameter and are distributed in the second area of representation according to at least a second set of second parameters. For example, said probability distribution is the multivariate normal distribution and each second distribution is a Gaussian distribution defined by a vector of means, a covariance matrix and a prior probability.

Each second distribution defines a sub-space of the second area of representation. In the previous example, if a Gaussian distribution covers by definition the entire space on which it is defined, each second Gaussian distribution of the second set of distributions intersects each of the other second distributions of the set. Thus, the second set of second Gaussian distributions obviously entirely covers the second area of representation and particularly each point of the area of representation. Matching each second distribution with a sub-space of the area of representation must be interpreted as the fact of considering that each point of the sub-space, located outside an intersection area between second neighboring distributions is only described by the second distribution of the set exhibiting the largest value at this point. The limits of the sub-spaces are defined by the intersection areas between the second neighboring distributions.

The first statistical model is constructed such as to represent the universal collection 11 of biometric data with maximum likelihood. To this end, the second set of second parameters is optimized by a first implementation 7 of a likelihood maximization algorithm.

In an embodiment of the method, the first statistical model thus constructed is a hidden Markov model defined by the second finite set of second distributions according to sets of parameters whereof at least one set of state probabilities, each associated with a biometric data, and a set of transition probabilities between states, the first implementation 7 consisting in implementing the so-called Baum Welch likelihood maximization algorithm.

Thus, the method makes it possible to construct a first statistical model which takes into consideration the biometric data processing sequence.

In another embodiment of the method, the first statistical model thus constructed is a Gaussian mixture model defined by the second finite set of second distributions according to sets of parameters whereof a set of means, a covariance matrix and a set of prior probabilities, each associated with a biometric data, the first implementation 7 consisting in implementing the likelihood maximization algorithm called expectation-maximization according to a criterion of maximum likelihood.

The method, thus makes it possible to construct a first statistical model independent from the biometric data processing sequence, thus allowing for unsupervised automatic learning and/or classification.

In the scope of voice recognition, the first statistical model consists in a model known by initials UBM (Universal Background Model). The present invention is in no way limited to this particular scope, the applicant focused on defining the first statistical model in the most generic possible way, the skilled person, able if need be to refer to the more specific approach, and hence the easiest, making it possible to construct said UBM.

The first statistical model 3 constructed in the manner described above is thus at least capable of matching any biometric data 1, whether the latter belongs or not to said universal collection, with a determined sub-space. It is worth mentioning that each second distribution comprising a plurality of first distributions representative of a part of said universal collection 11 of biometric data, each sub-space is associated with a plurality of biometric data.

The method further comprises a second step of constructing a second statistical model comprising a plurality of statistical sub-models in automatic classification of a set of first individual collections of biometric data, each sub-model being defined in a corresponding sub-space of the second area of representation. This step is described below with reference to FIG. 3.

The second step of constructing the second statistical model 4 comprises, for each distribution representative of each biometric data of each individual collection 12, the determination of the sub-space corresponding to it according to the first statistical model 3. In this manner, it is possible to classify during a classification step 8, each biometric data of each individual collection 12 in the sub-model 41 corresponding to the determined sub-space for this biometric data by the first statistical model 3.

In order to construct the second statistical model, a large distribution set is constituted for each sub-model of the first statistical model. For each individual collection of biometric data available, at least a parameter of the universal model is adapted to obtain a model close to the considered biometric data in accordance with the MAP, by employing the expectation-maximization algorithm. The regulation factor of the MAP is selected such as to make the MAP closer to the criterion of Maximum Likelihood.

At least one of the distributions associated with each sub-model of the considered model is placed in the corresponding distribution set.

It is worth noting here that if the individual collections 12 of biometric data can consist in a partition of the universal collection per individual, they can just as well be established partially or entirely decorrelated. In this last case, the biometric data of each universal collection have not served to construct the first statistical model. However, and this is where the power of the approach in statistical modeling resides, whatever the input biometric data, the first statistical model is able to match it with a determined sub-space.

The result of the classification step 8 is that each sub-model 41 is defined by a third set of first distributions 2. For example in the case where each said first distributions 2 is a Gaussian distribution, each statistical sub-model 41 of the second statistical model 4 is defined by a third set of Gaussian distributions according to the sets of parameters whereof a set of means and a set of standard deviations.

The second step of constructing the second statistical model further comprises, for each sub-space, a step of selecting 9 first distributions amongst said third set of first distributions. This selection 9 is achieved by implementing a coverage maximization and redundancy minimization iterative algorithm. This algorithm considers one by one the distributions of the third set of first distributions and is iterated a large number of times in order to determine a fourth minimum set 21 of first distributions 2 maximizing the coverage of the sub-space. The large number of iterations is determined by a criterion of algorithm convergence. It is worth noting that, by minimal set, is meant set exhibiting the smallest possible cardinal. The minimum required cardinal of each fourth set is not known in principle, but is a result of the implementation of the coverage maximization and redundancy minimization iterative algorithm.

Figure 4:
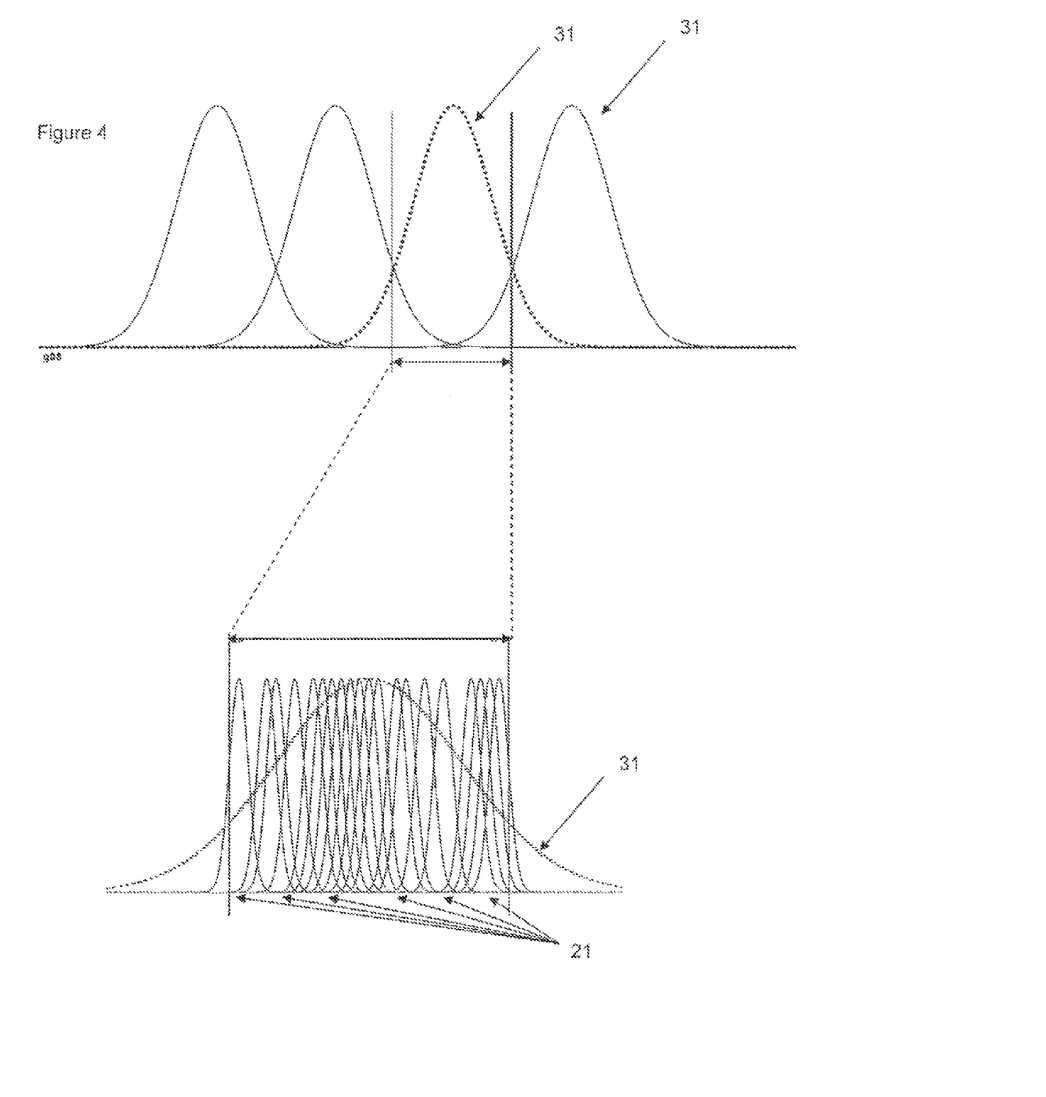
FIG. 4 represents two graphs illustrating the distribution in a sub-space of interest of a distribution set representative of specificities of an individual or of a class of individuals.

For each sub-model, the result of the selection step 9, particularly such as illustrated in FIG. 4, is that each sub-model 41 is defined by the fourth minimum set 21 of first corresponding distributions. As for plurality of statistical sub-models 41 of the second statistical model 4, the result of the selection step is that the plurality of statistical sub-models 41 is defined by a plurality of fourth minimum sets of first distributions.

For example in the case where each said first distributions 2 is a Gaussian distribution, it is worth noting that the implementation of said coverage maximization and redundancy minimization iterative algorithm can advantageously be simplified by considering or not a set of standard deviations determining said fourth minimum set 21 of first distributions, but a mean covariance matrix 42, from an average on said standard deviation set.

The second statistical model 4 such as constructed in the manner defined above is thus at least able to make it possible, for any biometric data of a sub-space determined according to the first statistical model 3, to determine the first distribution with which its likelihood is maximum amongst the first distributions of the fourth minimum set 21 of first corresponding distributions.

The classification method thus makes it possible to construct, on the basis of a first universal statistical model, a second statistical model taking into consideration the biometric specificities of an individual or a class of individuals. In fact, the information that was voluntarily lost during the construction of the first statistical model, so that it exhibits the power of the approach by statistical modeling specific to it, is thus reintroduced, and in an organized and controlled manner. These two statistical models jointly define a highly discriminatory universal statistical model.

Figure 5:
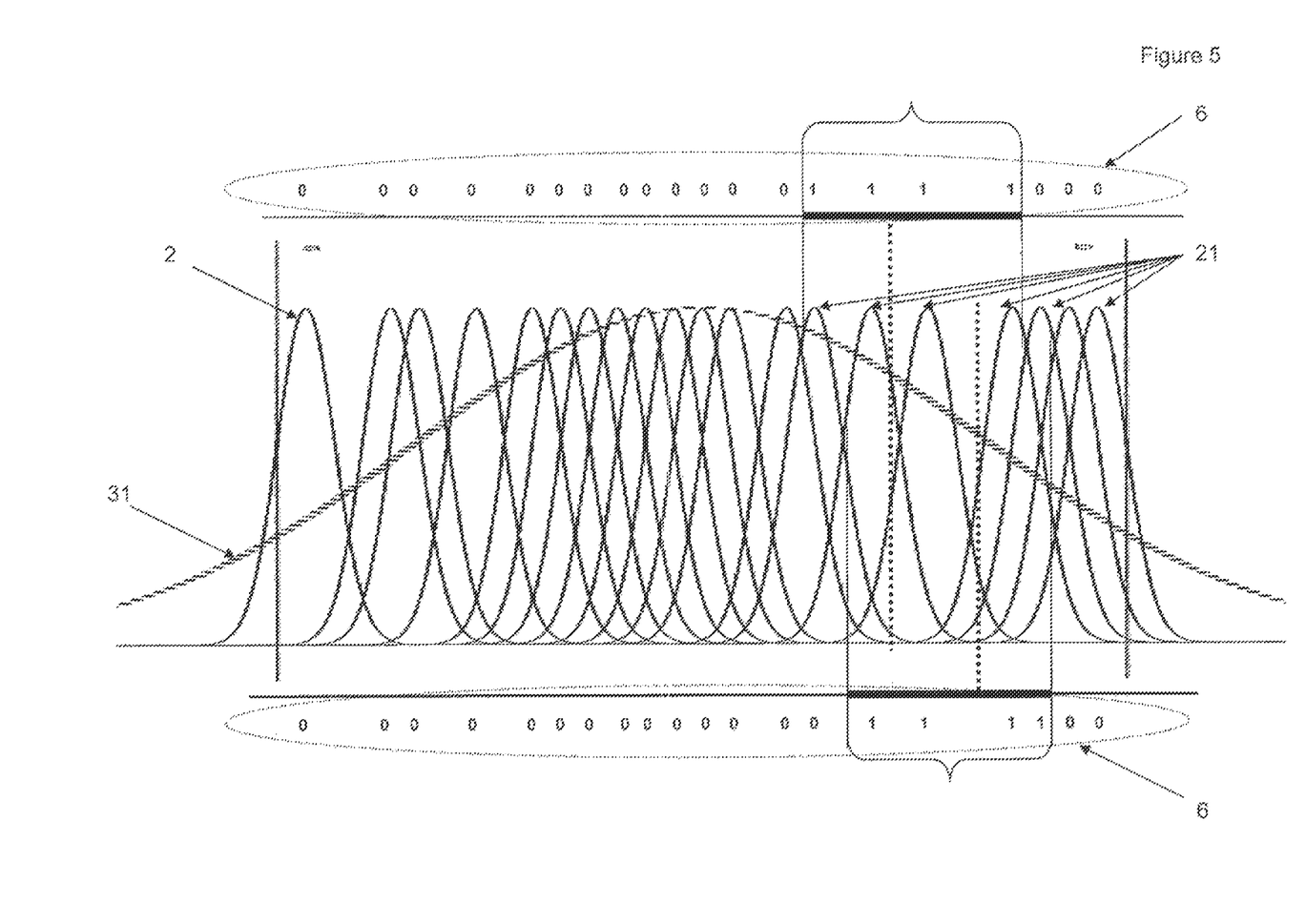
FIG. 5 resumes the second graph of FIG. 4 and matches it with the step of selecting a distribution set representative of the specificities of an individual or a class of individuals according to the biometric data classification method.

Furthermore, and as this will become apparent in the rest of the description, particularly its part made with reference to FIG. 5, the above established technical characteristics of said highly discriminatory universal statistical model make it possible to achieve great robustness of the classification method with respect to small variations or errors on the input biometric data and with respect to the sources of variability, mentioned in the introduction.

Figure 6:
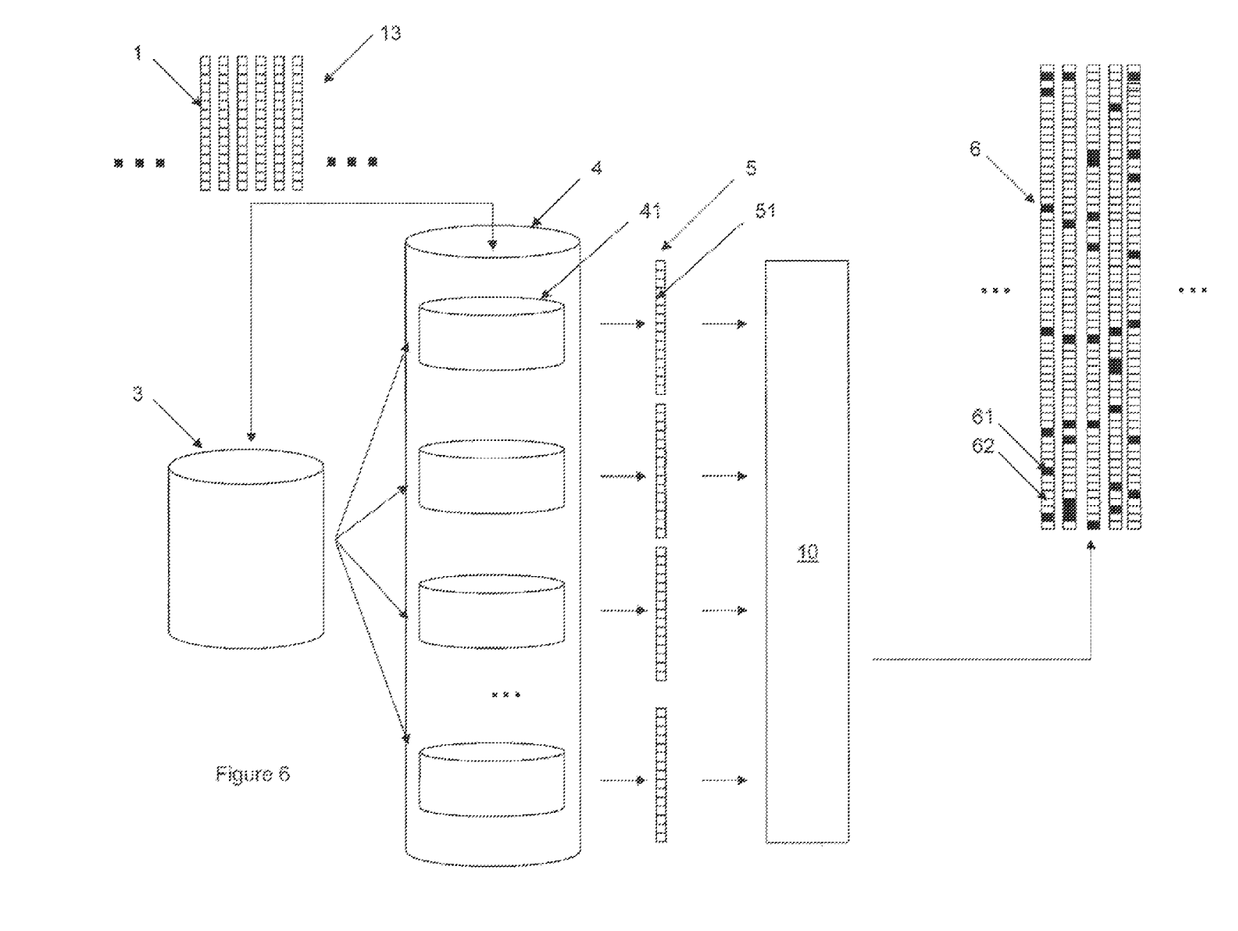
FIG. 6 schematically represents the step of generating a set of likelihood vectors and the step of generating a set of first binary vectors based on the second individual collection of biometric data.

With reference to FIG. 6, the biometric data classification method further comprises a first step of generating a set of likelihood vectors 5 based on a second individual collection 13 of biometric data. This individual collection 13 of biometric data is from the detection by a sensor of a determined type of a biometry of an individual. Such detection must be achieved at least twice to make it possible to authenticate an individual: once to deduce information constituting a reference and once to deduce authentication information by comparing it with the reference information.

The step of generating a set of likelihood vectors 5 based on the second individual collection 13 of biometric data comprises for each first distribution representative of each biometric data 1 of the second individual collection:

determining the sub-space which corresponds to it according to the first statistical model 3, in this sub-space, the computation of a likelihood value 51 between the first distribution 1 representative of the considered biometric data and each of the first distributions of the fourth minimum set 21 corresponding to the sub-space, and selecting at least one likelihood value amongst the highest.

The step of generating a set of likelihood vectors 5 thus makes it possible to generate based on each data of said second individual collection 13 of biometric data and for each statistical sub-model 41 of the second statistical model 4, a likelihood vector 5 composed of selected likelihood values 51.

Thus, the joint usage of the first and second statistical models makes it possible to generate a highly discriminatory information representing the identity of an individual according to his/her biometric data, whether the latter are part or not of said universal collection of biometric data or said set of first individual collections. However, the likelihood values are real numbers. Consequently, each likelihood vector is composed of sequences of real numbers particularly heavy to manipulate and store.

With reference to FIG. 6, the method for classifying biometric data further comprises a step of generating a set of first binary vectors 6 based on the set of previously generated likelihood vectors, and by extension based on the second individual collection 13 of biometric data. This step consisting for each likelihood vector 5 in achieving a statistical sampling 10 to project each likelihood vector in the binary space wherein the real likelihood values, are represented by a bit 61 equal to 1 or by a bit 62 equal to 0.

By a first example, the statistical sampling 10 more particularly consists in replacing the likelihood values 51 higher than a first threshold value determined by a bit equal to 1 and replacing the others by a bit equal to 0.

By a second example, the statistical sampling 10 more particularly consists in replacing the highest number N of likelihood values 51 by a bit equal to 1 and replacing the others by a bit equal to 0, the number N being predetermined or the number N being estimated based on the considered biometric data.

The result of the step of generating a set of first binary vectors is that to each biometric data 1 of the individual collection 13 corresponds a first binary vector 6.

The classification method thus makes it possible to represent the highly discriminatory information representing the identity of an individual in a binary form whereof the storage, electronic manipulation and transfer are easy and to make available to methods and authentication systems the wide scope defined in the binary space.

With reference to FIG. 5, it clearly appears that once projected into the binary space, two likelihood vectors different due to small variations or errors on the input biometric data and/or due to the fact that the sources of variability give two first binary vectors exhibiting at least the same sequence of bits equal to 1. This is directly linked to the way the second statistical model is constructed and more particularly at the selection step 9. However, and as we will see hereinafter, the score and authentication decision depending according to the present invention on the comparison between binary vectors, this characteristic renders the score and authentication decision hardly variable with respect to the small variations or errors on the input biometric data and with respect to the sources of variability. These considerations illustrate the robustness of the present approach.

The biometric data classification method further comprises a step of generating at least a second binary vector from the set of first binary vectors or sub-sets of first binary vectors. This step consists in achieving, between the first binary vectors of the set or of each sub-set, a logic operation amongst those consisting in:

implementing a majority voting algorithm in order to determine, by bit-to-bit sequential comparisons between the first considered binary vectors, said at least a second binary value by a distributed set of bits equal to 1, each corresponding to a mean occurrence of bits equal to 1 higher than a second determined threshold value, or implementing a sequential bit-to-bit logic comparison algorithm of "AND" or "exclusive-OR" type between the first considered binary vectors in order to determine said at least second binary vector by a distributed set of bits equal to 1, each corresponding to a total occurrence of bits equal to 1 or to a unique occurrence of a bit equal to 1 amongst the first considered binary vectors, respectively, or implementing a vector to vector movement synchrony determining algorithm amongst the first considered binary vectors, to determine said at least second binary vector by a set of bits equal to 1 distributed according to a sequence of bits equal to 1 of the first binary vectors observed with a mean occurrence higher than a third determined threshold value.

This step maintains the number of bits per vector. Thus, said at least second binary vector comprises the same number of bits as each said first binary vectors. The choice of logic operation is dictated by the number of bits equal to 1 of said at least second binary vector obtained.

As aforementioned, the biometric data classification method thus makes it possible to easily control the identity of an individual by the simple comparison of two second binary vectors determined independently, a second binary vector said of reference and a second binary vector said of authentication.

Each first or second binary vector comprises a number of bits equal to 1 determined among others according to one of the first, second and third threshold values. This number is lower by at least one order of magnitude with respect to the number of bits equal to 0.

By defining "hollow" binary vectors, in other words comprising more bits equal to 0 than bits equal to 1, or vice versa, the method makes it possible to ensure a high finely controlled level of discrimination and easily define and adjust a tolerance threshold for the authentication decision from the comparison between a second binary reference vector and a second binary authentication vector. The tolerance threshold is for example defined by a number of differences in terms of bits or bit sequences over a total number of bits of each of said second binary vectors or over an identical number of bit sequences determined by comparing these two binary vectors respectively.

The invention also relates to a biometric authentication method.

The biometric authentication method comprises at least a step of detecting a biometry determined by a sensor of determined type and of processing the detected biometry in order to transform it into a second individual collection 13 of biometric data representative of an individual.

The biometric authentication method further comprises at least a step of classifying biometric data 1 such as described above. The implementation of the classification method is intended to determine a second binary reference vector, which is then a second binary authentication vector based on said individual collection of biometric data.

The biometric authentication method further comprises a step of comparing these two second binary vectors and a step of deciding to authenticate or not an individual on the basis of the result of the previous comparison step.

The comparison step more particularly consists in implementing an algorithm for determining movement synchrony between the second binary reference vector and the second binary authentication vector for determining the occurrence of bit sequences equal to 1 identical between these two vectors.

The step of deciding to authenticate or not an individual more particularly comprises a step of defining and adjusting a tolerance threshold for the authentication decision. The tolerance threshold is defined by a number of differences in terms of bits or bit sequences over a total number of bits of each said second binary vectors or over a number of identical bit sequences between these two binary vectors respectively determined during the comparison step.

The steps of comparing and deciding to authenticate or not an individual do not require much computing resources or storage capacity. They can advantageously be implemented on small portable devices, such as a chip card of a payment card or of access to a secure location.

The invention also relates to a biometric authentication system which comprises:
   a sensor of a determined type able to detect a determined biometry and transform it into a second individual collection 13 of biometric data representative of an individual to be authenticated,
   a first memorization medium able to store at least the first and second statistical models and a computer able to implement at least a step of the biometric data classification method 1 described above possible, in order to obtain at least a second binary authentication vector based on the second individual collection 13 of biometric data having been transmitted thereto by the sensor,
   a comparator module for comparing the second binary authentication vector with a second binary reference vector previously generated and stored in a second memorization medium connected to the comparator module, and
   a decision module for deciding to authenticate an individual or not.

In an embodiment of the system, the memorization medium, the computer, the comparator module and the decision module are embedded in a same device communicating by wire connection or radiofrequency. For example, the system consists in a portable telephone communicating the result of the voice recognition to a banking server in order to allow for a transfer of funds. By another example, the system is installed at the entrance of a secure location and serves to authenticate the individual standing in the entrance by facial and/or voice recognition, and transmit the authentication result to a locking/unlocking device of the entrance door of the secured location.

In another embodiment, the first memorization medium and the computer are embedded in a first device communicating by wire connection or radiofrequency and connected to the sensor, and the second memorization medium, the comparator module and the decision module are embedded in a second device communicating by wire connection or radiofrequency with the first communicating device to transmit the authentication result to the first device or to a third device.

For example said first device is a device of cash register type and the second device is a payment card with chip. The authentication of an individual does not advantageously require the transfer of actual biometric data which could be stolen, but much easier, the transfer of a second binary vector.

The invention also relates to a computer program product for biometric authentication comprising portions of program code saved on a computer readable medium, to implement at least a step of the aforementioned biometric data classification method, when the program operates on a computer.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A method for classifying biometric data belonging to a first continuous and limited area of representation corresponding to at least one determined type biometric sensor, comprising:
   a step of acquiring by said at least one sensor of determined type biometric data in the form of a set of multidimensional vectors of parameters,
   a step of defining a second area of representation wherein each biometric data is represented by a first distribution such that the biometric data are represented thereto by a first set of first distributions, the first distributions responding to a same probability distribution function of at least one first parameter, such that the first set of first distributions is defined by a first set of first parameters determined based on biometric data,
   a first step of constructing a first statistical model in automatic classification of a universal collection of biometric data in the second area of representation,
   the first statistical model being defined by at least one second finite set of second distributions, the second distributions responding to a same probability distribution function of at least one second parameter and being distributed in the second area of representation according to at least one second set of second parameters, such that each second distribution defines a sub-space of the second area of representation comprising a plurality of first distributions representative of a part of said universal collection of biometric data,
   the second set of second parameters being optimized by a first implementation of a likelihood maximization algorithm, such that the second finite set of second distributions represents with the maximum likelihood the first set of first distributions corresponding to said universal collection of biometric data,
   the first statistical model thus being able to match any biometric data with a determined sub-space, each sub-space being associated with a plurality of biometric data, and a second step of constructing a second statistical model comprising a plurality of statistical sub-models in automatic classification of a set of first individual collections of biometric data, each sub-model being defined in a corresponding sub-space of the second area of representation, the second construction step comprising, for each distribution representative of each biometric data of each individual collection, the determination of a sub-space corresponding thereto according to the first statistical model, and in this sub-space, its classification in the corresponding sub-model, such that each sub-model is defined by a third set of first distributions, the second construction step further comprising, for each sub-space, a step of selecting first distributions amongst said third set of first distributions by implementing a coverage maximization and redundancy minimization iterative algorithm, for determining a fourth minimum set of first distributions maximizing the coverage of the sub-space, such that each sub-model is defined by the fourth minimum set of first distributions corresponding thereto, such that the plurality of statistical sub-models of the second statistical model is defined by a plurality of fourth minimum sets of first distributions, the second statistical model being thus able to make it possible for any biometric data of a determined sub-space according to the first statistical model, to determine the first distribution with which its likelihood is maximum from amongst the first distributions of the fourth minimum set of first corresponding distributions, a step of saving to a memorization medium first and second statistical models, such as to make their future use in automatic classification of biometric data possible.

2. The method according to claim 1, further comprising a first step of generating a set of likelihood vectors based on a second individual collection of biometric data, the generation step comprising, for each first distribution representative of each biometric data of the second individual collection:

determining the sub-space which corresponds to it according to the first statistical model, in this sub-space, the computation of a likelihood value between the first distribution representative of the considered biometric data and each one of the first distributions of the fourth minimum set corresponding to the sub-space, and selecting at least one likelihood value amongst the highest, so as to generate a likelihood vector composed of selected likelihood values based on each biometric data of said second individual collection of biometric data and for each statistical sub-model of the second statistical model.

3. The method according to claim 2, further comprising a step of generating a set of first binary vectors based on the second individual collection of biometric data, the step for providing a statistical sampling for each vector likelihood vector comprising:

replacing the likelihood values higher than a first threshold value determined by a bit equal to 1 and replacing the others by a bit equal to 0, or replacing a number N of highest likelihood values by a bit equal to 1 and replacing the others by a bit equal to 0, such that each biometric data corresponds to a first binary vector.

4. The method according to claim 3, further comprising a step of generating at least a second binary vector from at least a subset of the set of first binary vectors, the step of providing, between the first set or subset of binary vectors, at least one logical operation selected from the group consisting of:

a majority voting algorithm in order to determine, by bit-to-bit sequential comparisons between the first considered binary vectors, said at least a second binary vector by a distributed set of bits equal to 1, each corresponding to a mean occurrence of bits equal to 1 higher than a second determined threshold value, a logic sequential bit-to-bit comparison algorithm of "AND" or "exclusive-OR" type between the first considered binary vectors in order to determine said at least second binary vector by a distributed set of bits equal to 1, each corresponding to a total occurrence of bits equal to 1 or to a unique occurrence of a bit equal to 1 amongst the first considered binary vectors, respectively, and a vector to vector movement synchrony determining algorithm amongst the first considered binary vectors, to determine said at least second binary vector by a set of bits equal to 1 distributed according to a sequence of bits equal to 1 of the first binary vectors observed with a mean occurrence higher than a third determined threshold value, said at least second binary vector comprising the same number of bits as each of said first binary vectors and the choice of the logic operation being dictated by the number of bits equal to 1 of said at least second binary vector obtained.

5. The method according to claim 3, wherein each first or second binary vector comprises a number of bits equal to 1 determined among others according to one of the first, second and third threshold values, this number being lower by at least an order of magnitude with respect to the number of bits equal to 0.

6. The method according to claim 1, wherein the first statistical model is a hidden Markov model defined by the second finite set of the second distributions according to the sets of parameters whereof at least a set of state probabilities, each associated with a biometric data, and a set of transition probabilities between states, the first implementation consisting in implementing the so-called Baum-Welch likelihood maximization algorithm.

7. The method according to claim 1, wherein the first statistical model is a Gaussian mixture model defined by the second finite set of second distributions according to the sets of parameters whereof a set of means, each associated with a biometric data, and a set of standard deviations, each associated with a biometric data, the first implementation consisting in implementing the likelihood maximization algorithm called expectation-maximization algorithm according to a criterion of determined maximum likelihood.

8. The method according to claim 1, wherein each said first distributions is a Gaussian distribution, such that each statistical sub-model of the second statistical model is defined by a third set of Gaussian distributions according to sets of parameters whereof a set of means, each associated with a biometric data and a mean covariance matrix, from an average over a set of standard deviations.

9. The method according to claim 1, wherein the set of first individual collections of biometric data is from a cut-out of the universal collection of biometric data.

10. A biometric authentication method comprising:

a step of detecting a biometry determined by a sensor of determined type and of processing the detected biometry in order to transform it into a second individual collection of biometric data representative of an individual;

a step of implementing a biometric data classification method comprising at least the method steps of:

a step of acquiring by said at least one sensor of determined type biometric data in the form of a set of multidimensional vectors of parameters, a step of defining a second area of representation wherein each biometric data is represented by a first distribution such that the biometric data are represented thereto by a first set of first distributions, the first distributions responding to a same probability distribution function of at least one first parameter, such that the first set of first distributions is defined by a first set of first parameters determined based on biometric data, a first step of constructing a first statistical model in automatic classification of a universal collection of biometric data in the second area of representation, the first statistical model being defined by at least one second finite set of second distributions, the second distributions responding to a same probability distribution function of at least one second parameter and being distributed in the second area of representation according to at least one second set of second parameters, such that each second distribution defines a sub-space of the second area of representation comprising a plurality of first distributions representative of a part of said universal collection of biometric data, the second set of second parameters being optimized by a first implementation of a likelihood maximization algorithm, such that the second finite set of second distributions represents with the maximum likelihood the first set of first distributions corresponding to said universal collection of biometric data, the first statistical model thus being able to match any biometric data with a determined sub-space, each sub-space being associated with a plurality of biometric data, and a second step of constructing a second statistical model comprising a plurality of statistical sub-models in automatic classification of a set of first individual collections of biometric data, each sub-model being defined in a corresponding sub-space of the second area of representation, the second construction step comprising, for each distribution representative of each biometric data of each individual collection, the determination of a sub-space corresponding thereto according to the first statistical model, and in this sub-space, its classification in the corresponding sub-model, such that each sub-model is defined by a third set of first distributions, the second construction step further comprising, for each sub-space, a step of selecting first distributions amongst said third set of first distributions by implementing a coverage maximization and redundancy minimization iterative algorithm, for determining a fourth minimum set of first distributions maximizing the coverage of the sub-space, such that each sub-model is defined by the fourth minimum set of first distributions corresponding thereto, such that the plurality of statistical sub-models of the second statistical model is defined by a plurality of fourth minimum sets of first distributions, the second statistical model being thus able to make it possible for any biometric data of a determined sub-space according to the first statistical model, to determine the first distribution with which its likelihood is maximum from amongst the first distributions of the fourth minimum set of first corresponding distributions, a step of saving to a memorization medium first and second statistical models, such as to make their future use in automatic classification of biometric data possible, in order to determine a second binary reference vector and a second binary authentication vector based on said individual collection of biometric data;

a step of comparing theses two second binary vectors; and a step of deciding whether to authenticate an individual on the basis of the result of the previous comparison step.

11. The biometric authentication method according to claim 10, wherein the comparison step consists in implementing a movement synchrony determining algorithm between the second binary reference vector and the second binary authentication vector in order to determine the occurrence of sequences of bits equal to 1 identical between these two vectors.

12. The biometric authentication method according to claim 10 wherein the step of deciding whether to authenticate an individual comprises a step of defining and adjusting a tolerance threshold for the authentication decision, the tolerance threshold being defined by a number of differences in terms of bits or sequences of bits over a total number of bits of each said second binary vectors or over a number of sequences of identical bits between these two binary vectors determined during the comparison step, respectively.

13. A biometric authentication system comprising:

a sensor of determined type able to detect a determined biometry and transform it into a second individual collection of biometric data representative of an individual to be authenticated;

a first memorization medium able to store at least first and second statistical models and a computer able to make it possible to implement a biometric data classification method comprising at least the method steps of:

a step of acquiring by said at least one sensor of determined type biometric data in the form of a set of multidimensional vectors of parameters, a step of defining a second area of representation wherein each biometric data is represented by a first distribution such that the biometric data are represented thereto by a first set of first distributions, the first distributions responding to a same probability distribution function of at least one first parameter, such that the first set of first distributions is defined by a first set of first parameters determined based on biometric data, a first step of constructing a first statistical model in automatic classification of a universal collection of biometric data in the second area of representation, the first statistical model being defined by at least one second finite set of second distributions, the second distributions responding to a same probability distribution function of at least one second parameter and being distributed in the second area of representation according to at least one second set of second parameters, such that each second distribution defines a sub-space of the second area of representation comprising a plurality of first distributions representative of a part of said universal collection of biometric data, the second set of second parameters being optimized by a first implementation of a likelihood maximization algorithm, such that the second finite set of second distributions represents with the maximum likelihood the first set of first distributions corresponding to said universal collection of biometric data, the first statistical model thus being able to match any biometric data with a determined sub-space, each sub-space being associated with a plurality of biometric data, and a second step of constructing a second statistical model comprising a plurality of statistical sub-models in automatic classification of a set of first individual collections of biometric data, each sub-model being defined in a corresponding sub-space of the second area of representation, the second construction step comprising, for each distribution representative of each biometric data of each individual collection, the determination of a sub-space corresponding thereto according to the first statistical model, and in this sub-space, its classification in the corresponding sub-model, such that each sub-model is defined by a third set of first distributions, the second construction step further comprising, for each sub-space, a step of selecting first distributions amongst said third set of first distributions by implementing a coverage maximization and redundancy minimization iterative algorithm, for determining a fourth minimum set of first distributions maximizing the coverage of the sub-space, such that each sub-model is defined by the fourth minimum set of first distributions corresponding thereto, such that the plurality of statistical sub-models of the second statistical model is defined by a plurality of fourth minimum sets of first distributions, the second statistical model being thus able to make it possible for any biometric data of a determined sub-space according to the first statistical model, to determine the first distribution with which its likelihood is maximum from amongst the first distributions of the fourth minimum set of first corresponding distributions, a step of saving to a memorization medium first and second statistical models, such as to make their future use in automatic classification of biometric data possible, in order to obtain at least a second binary authentication vector based on the second individual collection of biometric data having been transmitted thereto by the sensor;

a comparator model for comparing the second binary authentication vector with a second binary reference vector previously generated and stored to a second memorization medium connected to the comparator module; and a decision module to decide whether to authenticate an individual.

14. The biometric authentication system according to claim 13, wherein the memorization medium, computer, comparator module and decision module are embedded in a same device.

15. The biometric authentication system according to claim 13, wherein:

the first memorization medium and computer are embedded in a first device and connected to the sensor, and the second memorization medium, the comparator module and the decision module are embedded in a second device communicating with the first communication device in order to transmit the authentication result to the first device.

16. A biometric authentication computer program product comprising portions of program code registered on a computer readable medium, to implement a biometric data classification method comprising at least the method steps of:

a step of acquiring by said at least one sensor of determined type biometric data in the form of a set of multidimensional vectors of parameters, a step of defining a second area of representation wherein each biometric data is represented by a first distribution such that the biometric data are represented thereto by a first set of first distributions, the first distributions responding to a same probability distribution function of at least one first parameter, such that the first set of first distributions is defined by a first set of first parameters determined based on biometric data, a first step of constructing a first statistical model in automatic classification of a universal collection of biometric data in the second area of representation, the first statistical model being defined by at least one second finite set of second distributions, the second distributions responding to a same probability distribution function of at least one second parameter and being distributed in the second area of representation according to at least one second set of second parameters, such that each second distribution defines a sub-space of the second area of representation comprising a plurality of first distributions representative of a part of said universal collection of biometric data, the second set of second parameters being optimized by a first implementation of a likelihood maximization algorithm, such that the second finite set of second distributions represents with the maximum likelihood the first set of first distributions corresponding to said universal collection of biometric data, the first statistical model thus being able to match any biometric data with a determined sub-space, each sub-space being associated with a plurality of biometric data, and a second step of constructing a second statistical model comprising a plurality of statistical sub-models in automatic classification of a set of first individual collections of biometric data, each sub-model being defined in a corresponding sub-space of the second area of representation, the second construction step comprising, for each distribution representative of each biometric data of each individual collection, the determination of a sub-space corresponding thereto according to the first statistical model, and in this sub-space, its classification in the corresponding sub-model, such that each sub-model is defined by a third set of first distributions, the second construction step further comprising, for each sub-space, a step of selecting first distributions amongst said third set of first distributions by implementing a coverage maximization and redundancy minimization iterative algorithm, for determining a fourth minimum set of first distributions maximizing the coverage of the sub-space, such that each sub-model is defined by the fourth minimum set of first distributions corresponding thereto, such that the plurality of statistical sub-models of the second statistical model is defined by a plurality of fourth minimum sets of first distributions, the second statistical model being thus able to make it possible for any biometric data of a determined sub-space according to the first statistical model, to determine the first distribution with which its likelihood is maximum from amongst the first distributions of the fourth minimum set of first corresponding distributions, a step of saving to a memorization medium first and second statistical models, such as to make their future use in automatic classification of biometric data possible, when the program operates on a computer.

17. The method according to claim 4, wherein each first or second binary vector comprises a number of bits equal to 1 determined among others according to one of the first, second and third threshold values, this number being lower by at least an order of magnitude with respect to the number of bits equal to 0.

18. The biometric authentication method according to claim 11, wherein the step of deciding to authenticate or not an individual comprises a step of defining and adjusting a tolerance threshold for the authentication decision, the tolerance threshold being defined by a number of differences in terms of bits or sequences of bits over a total number of bits of each said second binary vectors or over a number of sequences of identical bits between these two binary vectors determined during the comparison step, respectively.

* * * * *